US010768415B2

(12) United States Patent
Hu et al.

(10) Patent No.: US 10,768,415 B2
(45) Date of Patent: Sep. 8, 2020

(54) DISPLAY DEVICE AND LIGHT SOURCE

(71) Applicants: Beijing BOE Display Technology Co., Ltd., Beijing (CN); BOE Technology Group Co., Ltd., Beijing (CN)

(72) Inventors: Weipin Hu, Beijing (CN); Jun Wu, Beijing (CN); Lianjie Qu, Beijing (CN); Yinglong Huang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/176,387

(22) Filed: Oct. 31, 2018

(65) Prior Publication Data

US 2019/0235234 A1     Aug. 1, 2019

(30) Foreign Application Priority Data

Jan. 29, 2018  (CN) .......................... 2018 1 0086235

(51) Int. Cl.
*G02B 27/00*  (2006.01)
*G02B 1/00*  (2006.01)
*G09G 3/00*  (2006.01)

(52) U.S. Cl.
CPC ......... *G02B 27/0081* (2013.01); *G02B 1/005* (2013.01); *G09G 3/001* (2013.01); *G09G 2320/068* (2013.01); *G09G 2358/00* (2013.01)

(58) Field of Classification Search
CPC .... G02B 27/0081; G02B 1/005; G09G 3/001; G09G 2320/068; G09G 2358/00

USPC ......................................................... 345/697
See application file for complete search history.

(56) References Cited

U.S. PATENT DOCUMENTS

| 2005/0220402 | A1* | 10/2005 | Takagi | G02F 1/011 385/31 |
| 2009/0273779 | A1* | 11/2009 | Baumberg | G01N 21/658 356/301 |
| 2010/0091225 | A1* | 4/2010 | Cho | G02B 1/005 349/105 |
| 2014/0198373 | A1* | 7/2014 | Ray | G02B 26/007 359/291 |
| 2015/0042702 | A1 | 2/2015 | Jiang et al. | |
| 2016/0252652 | A1* | 9/2016 | Shen | G02B 1/005 359/485.02 |

(Continued)

FOREIGN PATENT DOCUMENTS

| CN | 102645786 A | 8/2012 |
| CN | 103091756 A | 5/2013 |
| EP | 1 416 303 A2 | 5/2004 |

OTHER PUBLICATIONS

First Office Action, including Search Report, for Chinese Patent Application No. 201810086235.5, dated Apr. 15, 2019, 13 pages.

*Primary Examiner* — Amare Mengistu
*Assistant Examiner* — Gloryvid Figueroa-Gibson
(74) *Attorney, Agent, or Firm* — Westman, Champlin & Koehler, P.A.

(57) ABSTRACT

A display device and a light source are provided. The display device includes a display panel and a first photonic crystal layer arranged at a light-emitting side of the display panel. The first photonic crystal layer is configured to enable incident light to exit along a Z direction, the Z direction being a thickness direction of the first photonic crystal layer.

17 Claims, 8 Drawing Sheets

(56) References Cited

U.S. PATENT DOCUMENTS

2017/0045643 A1* 2/2017 Cunningham ........... G02B 1/04
2019/0198576 A1* 6/2019 Schubert .............. G01N 21/658
                                                                 356/301

* cited by examiner

DISPLAY DEVICE AND LIGHT SOURCE

CROSS-REFERENCE TO RELATED APPLICATION

This application claims a priority to Chinese Patent Application No. 201810086235.5 filed on Jan. 29, 2018, the disclosure of which is incorporated in its entirety by reference herein.

TECHNICAL FIELD

The present disclosure relates to the field of display technology, in particular to a display device and a light source.

BACKGROUND

Along with the development of society and enrichment in material conditions, the linkage between electronic equipment and people's life and work becomes tighter and tighter. Nowadays there are more and more types of electronic equipment such as desktop, laptop, cellular phone and e-book reader. While providing much convenience for people, the electronic equipment may cause leakage of personal information.

For example, a user may usually use the above-described electronic equipment in public places such as in internet bars, in metro or bus, and a display screen of the electronic equipment usually have a relatively wide viewing angle. Therefore, it is not good for protecting personal information security.

SUMMARY

In a first aspect, the present disclosure provides a display device, including a display panel and a first photonic crystal layer arranged at a light-emitting side of the display panel. The first photonic crystal layer is configured to enable incident light to exit along a Z direction of the first photonic crystal layer, the Z direction being a thickness direction of the first photonic crystal layer.

Optionally, the first photonic crystal layer includes a periodic structure having visible light photon forbidden bands in an X direction and in a Y direction. The X direction is different from the Y direction and a plane where the X direction and the Y direction are located is perpendicular to the Z direction.

Optionally, the display panel includes a first color sub-pixel, a second color sub-pixel and a third color sub-pixel. The first photonic crystal layer includes a first photonic crystal unit corresponding to the first color sub-pixel, a second photonic crystal unit corresponding to the second color sub-pixel, and a third photonic crystal unit corresponding to the third color sub-pixel. A frequency band of first color light emitted by the first color sub-pixel is within a photon forbidden band of the first photonic crystal unit, a frequency band of second color light emitted by the second color sub-pixel is within a photon forbidden band of the second photonic crystal unit, and a frequency band of third color light emitted by the third color sub-pixel is within a photon forbidden band of the third photonic crystal unit.

Optionally, a light-absorbing layer is arranged between any two adjacent crystal units of the first photonic crystal unit, the second photonic crystal unit and the third photonic crystal unit.

Optionally, a first adjusting component is arranged between the display panel and the first photonic crystal layer and the first adjusting component is configured to adjust an angle of the first photonic crystal layer relative to a light-emitting surface of the display panel.

Optionally, the first adjusting component includes a first substrate and a second substrate opposite to each other and a supporting structure arranged on the second substrate, the supporting structure being configured to support the first photonic crystal layer. The first substrate includes a first base plate and a first electrode arranged on the first base plate, and the second substrate includes a second base plate and a second electrode arranged on the second base plate. There is a distance between the first substrate and the second substrate, and the second base plate is a flexible base plate.

Optionally, the second base plate is made of at least one of polyimide, polycarbonate, polyacrylate and polyetherimide, and the second substrate is recessed inward or protruded outward by adjusting an electric field generated between the first electrode and the second electrode.

Optionally, the first photonic crystal layer includes multiple independent first photonic crystal blocks, and an angle of each of the plurality of first photonic crystal blocks relative to the light-emitting surface of the display panel is adjusted through a plurality of the first adjusting component.

Optionally, the display device further includes a collector configured to collect an image of a face or a pupil of a user. The display device further includes a controller configured to calculate a current position of the user based on the image of the face or the pupil of the user collected by the collector, and control the first adjusting component in a real-time manner based on the current position to adjust the angle of the first photonic crystal layer relative to the light-emitting surface of the display panel, to enable emergent light from the first photonic crystal layer to strike on the face or the pupil perpendicularly.

Optionally, the first photonic crystal layer includes a periodic structure having an auto-collimation effect in the Z direction, the incident light modulated by the periodic structure of a photonic crystal propagates in the Z direction along a straight line, and a width of a ray of the propagated light maintains unchanged.

Optionally, a second adjusting component is arranged between the display panel and the first photonic crystal layer, the second adjusting component is configured to adjust a shape of the first photonic crystal layer, and the shape of the first photonic crystal layer includes a flat shape and a protruding shape.

Optionally, the second adjusting component includes a third substrate and a fourth substrate arranged opposite to each other, and the first photonic crystal layer is arranged on the fourth substrate. The third substrate includes a third base plate and a third electrode arranged on the third base plate, and the fourth substrate includes a fourth base plate and a fourth electrode arranged on the fourth base plate. There is a distance between the third substrate and the fourth substrate, and the fourth base plate is a flexible base plate. The fourth base plate is protruded outward due to an electric field generated between the third electrode and the fourth electrode, the second adjusting component is configured to adjust the first photonic crystal layer to be in the protruding shape when an electric field is generated between the third electrode and the fourth electrode, and adjust the first photonic crystal layer to be in the flat shape when no electric field is generated between the third electrode and the fourth electrode.

Optionally, the first photonic crystal layer includes multiple independent first photonic crystal blocks, and each first photonic crystal block corresponds to one second adjusting component.

Optionally, the first photonic crystal layer is an air-hole two-dimensional photonic crystal layer including periodic air-holes, the air-holes each extending in the Z direction.

Optionally, the air-hole two-dimensional photonic crystal layer is made of a silicon thin film and the periodic air-holes are formed through processes including exposing and etching the silicon thin film.

Optionally, the first photonic crystal layer is a medium cylinder two-dimensional photonic crystal layer including periodic medium cylinders, the medium cylinders each extending in the Z direction.

Optionally, the periodic medium cylinders are formed by depositing a silicon thin film on a light-emitting surface of the display panel and through processes comprising exposing and etching the silicon thin film.

In a second aspect, the present disclosure provides a light source, including a light source body and a third photonic crystal layer. The third photonic crystal layer includes a periodic structure that enables incident light to generate an auto-collimation effect in a Z direction, the Z direction being a thickness direction of the third photonic crystal layer.

Optionally, a third adjusting component is arranged between the light source body and the third photonic crystal layer, the third adjusting component is configured to adjust a shape of the third photonic crystal layer, and the shape of the third photonic crystal layer includes a flat shape and a protruding shape.

Optionally, the third adjusting component includes a fifth substrate and a sixth substrate arranged opposite to each other, and the third photonic crystal layer is arranged on the sixth substrate. The fifth substrate in includes a fifth base plate and a fifth electrode arranged on the fifth base plate, and the sixth substrate includes a sixth base plate and a sixth electrode arranged on the sixth base plate. There is a distance between the fifth substrate and the sixth substrate, and the sixth base plate is a flexible base plate. The sixth base plate is protruded outward due to an electric field generated between the fifth electrode and the sixth electrode, the third adjusting component is configured to adjust the third photonic crystal layer to be in the protruding shape when an electric field is generated between the fifth electrode and the sixth electrode, and adjust the third photonic crystal layer to be in the flat shape when no electric field is generated between the fifth electrode and the sixth electrode.

BRIEF DESCRIPTION OF THE DRAWINGS

To better clarify embodiments of the present disclosure or technical solutions of related technologies, drawings to be used in describing the embodiments or the related technologies are introduced briefly hereinafter. Apparently, drawings described below are merely for a part of the embodiments of the present disclosure. The ordinary skilled in the art can obtain other drawings based on the disclosed drawings without paying creative efforts.

DETAILED DESCRIPTION

Technical solutions in embodiments of the present disclosure are described clearly and completely in conjunction with drawings in the embodiments of the present disclosure. Apparently, described embodiments are merely a part of rather than all of embodiments of the present disclosure. All other embodiments obtained by those ordinary skilled in the art based on the embodiments of the present disclosure without paying creative efforts fall within protection scope of the present disclosure.

Figure 1:
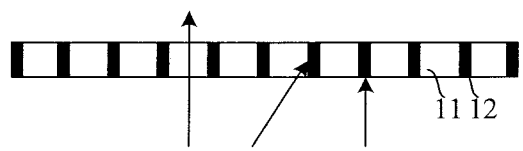
FIG. 1 is a schematic diagram of a privacy film in related technology.

In current privacy display technologies, usually a shutter privacy film (which has a thickness ranging from 1 mm to 2 mm) is added onto a surface of a display screen, such that an image displayed on the display screen is specific for a user to read in direct front of the display screen while persons located at two flanks can merely see a black screen, thereby effectively protecting trade secrets and personal privacy. FIG. 1 shows a structure of a privacy film in the related technology. The privacy film includes transparent parts 11 and non-transparent parts 12. A part of light emitted to the non-transparent parts 12 has relatively low transmittance such that light emitted from the display screen has poor uniformity, which severely decreases the transmittance and adversely affects user experience.

Figure 2:
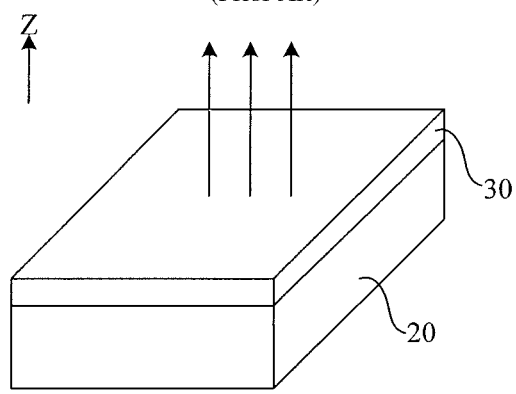
FIG. 2 is a schematic diagram of a display device according to at least one embodiment of the present disclosure.

A display device is provided according to at least one embodiment of the present disclosure. As shown in FIG. 2, the display device includes a display panel 20 and a first photonic crystal layer 30 arranged at a light-emitting side of the display panel 20. The first photonic crystal layer 30 is configured to make incident light exit along a Z direction, where the Z direction is a thickness direction of the first photonic crystal layer 30.

Photonic crystal is an artificially-designed and man-made crystal having a periodic dielectric structure in optical scale. By designing the photonic crystal, the first photonic crystal layer 30 may be configured to make the incident light exit along the Z direction. It can be understood that incident light entering the first photonic crystal layer 30 is light emitted by the display panel 20.

The display panel 20 may be of any type, for example, it may be a liquid crystal display panel, an organic light-emitting diode display panel and so on.

In the display device according to the embodiment of the present disclosure, by arranging the first photonic crystal layer 30 at the light-emitting side of the display panel 20, the light emitted by the display panel 20 propagates along the Z direction after passing through the first photonic crystal layer, and thus the display device is visible only at a front viewing angle, i.e., at the light-emitting side of the display device. Compared with the shutter privacy film in the related technologies, there is no problem that a part of light in the Z direction emitted to the non-transparent parts is blocked; hence, the transmittance of emergent light is high, and a light ray is uniform.

Optionally, the first photonic crystal layer 30 has a periodic structure having a visible light photon forbidden band in an X direction and a Y direction, a plane where the X direction and the Y direction are located being perpendicular to the Z direction. Optionally, the X direction is perpendicular to the Y direction.

The photon forbidden band of the photonic crystal is also called as a photonic band-gap (PBG). The photon forbidden band is a frequency band. Incident light whose frequency falls into the frequency band may be reflected and is incapable of passing through the photonic crystal. Specifically, in a case that there exists a periodic structure in any direction formed by periodically arranged media having different reflective indexes, a photon forbidden band may be generated in that direction. A frequency range of the photon forbidden band may be set based on parameters of a corresponding periodic structure.

Since the first photonic crystal layer 30 is arranged on the light-emitting side of the display panel 20, and light entering the first photonic crystal layer 30 may propagate in various directions, in order to make light in the Z direction exit, the first photonic crystal layer 30 should not have a photon forbidden band in the Z direction, or even there is a photon forbidden band in the Z direction, the photon forbidden band does not fall within a frequency range of the light emitted by the corresponding display panel 20.

Figure 3:
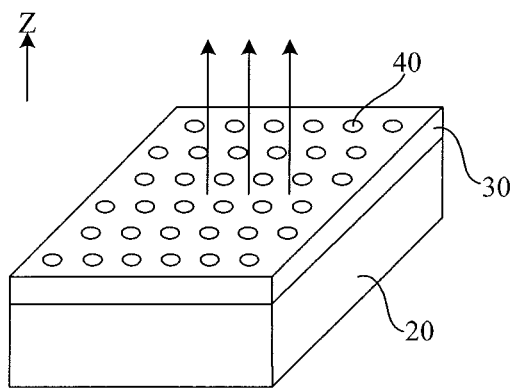
FIG. 3 is a schematic diagram of a display device according to at least one embodiment of the present disclosure.
Figure 4:
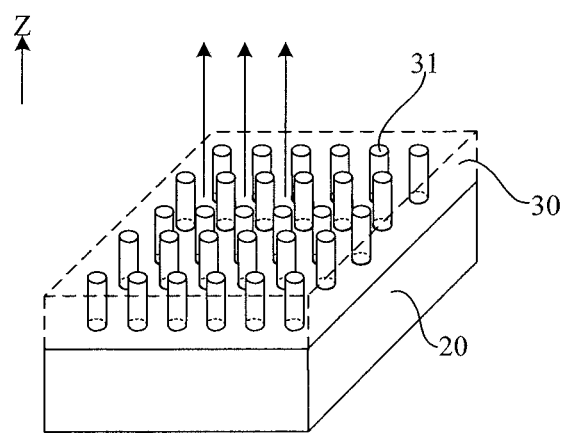
FIG. 4 is a schematic diagram of a display device according to at least one embodiment of the present disclosure.

Considering that a two-dimensional photonic crystal is easy to manufacture and a manufacturing process of the two-dimensional photonic crystal is highly compatible with that of the display panel 20, the two-dimensional photonic crystal may be made directly on the light-emitting side of the display panel 20, the manufacturing cost is low, and a thickness of the display device may not be hugely affected. As shown in FIG. 3 and FIG. 4, the first photonic crystal layer 30 may be a two-dimensional photonic crystal layer, that is, visible light photon forbidden bands are only generated in the X direction and the Y direction while no photon forbidden band is generated in the Z direction.

The two-dimensional photonic crystal is formed by two different media that are periodically arranged in a two-dimensional plane and uniformly distributed in a direction perpendicular to the two-dimensional plane. In an embodiment of the present disclosure, the two-dimensional plane is a plane perpendicular to the Z direction. In the two-dimensional plane, photon forbidden bands are generated in the X direction and the Y direction such that light within the photon forbidden bands cannot propagate along the X direction and along the Y direction. The X direction is perpendicular to the Y direction.

It should be noted that the uniform distribution in the direction perpendicular to the two-dimensional plane means that there exist merely one medium rather than a periodic structure of two media in the direction perpendicular to the two-dimensional plane. The medium in the direction perpendicular to the two-dimensional plane has a uniform density.

Figure 5A:
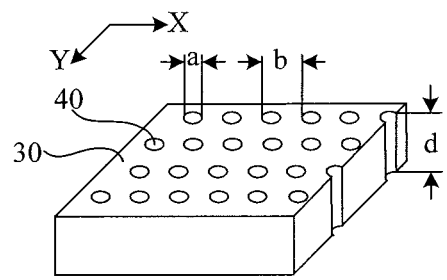
FIG. 5a is a schematic diagram of an air-hole two-dimensional photonic crystal layer according to at least one embodiment of the present disclosure.
Figure 5B:
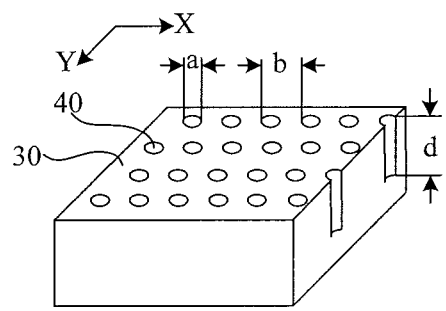
FIG. 5b is a schematic diagram of an air-hole two-dimensional photonic crystal layer according to at least one embodiment of the present disclosure.

In some optional embodiments, the first photonic crystal layer 30 may be an air-hole two-dimensional photonic crystal layer as shown in FIG. 3, FIG. 5a and FIG. 5b. Air-holes each extends in the Z direction.

In some optional embodiments, as shown in FIG. 5a, a depth of the air-hole 40 may be equal to a thickness of the first photonic crystal layer 30, that is, the air-hole 40 penetrates through the first photonic crystal layer 30. In some optional embodiments, as shown in FIG. 5b, the depth of the air-hole 40 may be smaller than the thickness of the first photonic crystal layer 30.

It should be understood that for the air-hole two-dimensional photonic crystal layer, one of the two media is air, and the air-holes 40 are formed in the other medium of the two media. In a case that the other medium is silicon, when manufacturing the air-hole two-dimensional photonic crystal layer, a silicon thin film may be first deposited onto the light-emitting side of the display panel 20, and then periodic air-holes 40 are formed by steps such as exposing and etching the silicon thin film.

A required photon forbidden band may be obtained by designing an aperture a and a period b of the air-holes 40, where the photon forbidden band forbids visible light from passing through it.

Figure 6:
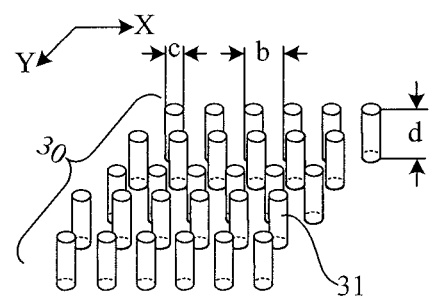
FIG. 6 is a schematic diagram of a medium cylinder two-dimensional photonic crystal layer according to at least one embodiment of the present disclosure.

In some optional embodiments, as shown in FIG. 4 and FIG. 6, the first photonic crystal layer 30 may specifically be a medium cylinder two-dimensional photonic crystal layer. Medium cylinders each extends in the Z direction.

The medium cylinders 31 may be formed directly on the display panel 20 or may be formed on a substrate which is in contact with the display panel 20.

It should be understood that, for the medium cylinder two-dimensional photonic crystal layer, one medium of the two media is a material of which the medium cylinder 31 are made, and the other medium is air. Still taking silicon for example, the medium cylinders 31 may be silicon cylinders. When manufacturing the two-dimensional photonic crystal layer, a silicon thin film may be firstly deposited onto the light-emitting side of the display panel 20, and then periodic silicon cylinders are formed by steps such as exposing and etching the silicon thin film.

A required photon forbidden band may be obtained by designing a diameter c and a period b of the medium cylinders 31, where the photon forbidden band forbids visible light from passing through.

In the embodiments of the present disclosure, by generating visible light photon forbidden bands in the X direction and the Y direction in the first photonic crystal layer 30, light within the photon forbidden bands cannot propagate along the X direction and along the Y direction, and only light in the Z direction (including light component in the Z direction) can exit from the first photonic crystal layer 30. Hence, the display device in the present disclosure can realize privacy protection not only from a left side and a right side, but also from a front side and a back side.

Figure 7:
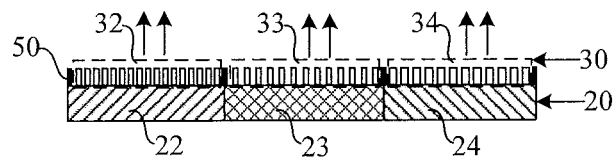
FIG. 7 is a schematic diagram of a display device according to at least one embodiment of the present disclosure.

Furthermore, as shown in FIG. 7, the display panel 20 includes a first color sub-pixel 22, a second color sub-pixel 23, and a third color sub-pixel 24. Correspondingly, the first photonic crystal layer 30 includes a first photonic crystal unit 32 corresponding to the first color sub-pixel 22, a second photonic crystal unit 33 corresponding to the second color sub-pixel 23, and a third photonic crystal unit 34 corresponding to the third color sub-pixel 24.

A frequency band of light of the first color is within a photon forbidden band of the first photonic crystal unit 32, a frequency band of light of the second color is within a photon forbidden band of the second photonic crystal unit 33, and a frequency band of light of the third color is within a photon forbidden band of the third photonic crystal unit 34.

The first color sub-pixel 22 emits the light of the first color, the second color sub-pixel 23 emits the light of the second color, and the third color sub-pixel 24 emits the light of the third color.

By designing an aperture a and a period b of air-holes 40 (or a diameter c and a period b of the medium cylinders 31) in the first photonic crystal unit 32, a photon forbidden band of the first photonic crystal unit 32 may include the frequency band of the light of the first color. By designing an aperture a and a period b of air-holes 40 (or a diameter c and a period b of the medium cylinders 31) in the second photonic crystal unit 33, a photon forbidden band of the second photonic crystal unit 33 may include the frequency band of the light of the second color. By designing an aperture a and a period b of air-holes 40 (or a diameter c and a period b of the medium cylinders 31) in the third photonic crystal unit 34, a photon forbidden band of the third photonic crystal unit 34 may include the frequency band of the light of the third color.

In view of the above, each of the light of the first color, the light of the second color and the light of the third color can exit merely along the Z direction and cannot propagate along other directions of the display device.

Based on the above, as shown in FIG. 7, a light-absorbing layer 50 is arranged between any two adjacent crystal units among the first photonic crystal unit 32, the second photonic crystal unit 33, and the third photonic crystal unit 34.

Optionally, the light-absorbing layer 50 is made of a black matrix material. The material of the light-absorbing layer 50 may be set according to actual situations as long as it has light-absorbing function.

By arranging the light-absorbing layer between adjacent photonic crystal units, light interference between sub-pixels may be prevented.

Figure 8:
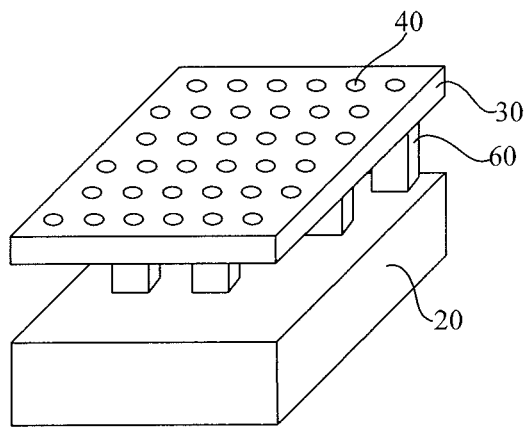
FIG. 8 is a schematic diagram of a display device according to at least one embodiment of the present disclosure.

On the basis that the first photonic crystal layer 30 includes a periodic structure having photon forbidden bands in the X direction and the Y direction. As shown in FIG. 8, a first adjusting component 60 is arranged between the display panel 20 and the first photonic crystal layer 30. The first adjusting component 60 is configured to adjust an angle of the first photonic crystal layer 30 relative to a light-emitting surface of the display panel 20.

In an embodiment of the present disclosure, the arrangement of the first adjusting component, the angle of the first photonic crystal layer 30 relative to the display panel 20 can be adjusted, thereby controlling an angle of emergent light from the display device and achieving dynamic privacy protection along with changing positions of the user.

Figure 9:
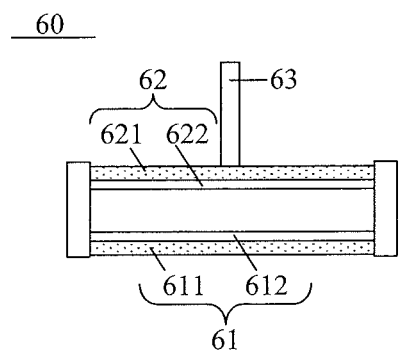
FIG. 9 is a schematic diagram of a first adjusting component according to at least one embodiment of the present disclosure.

As shown in FIG. 9, the first adjusting component 60 includes a first substrate 61 and a second substrate 62 opposite to each other, and a supporting structure 63 arranged on the second substrate 62. The supporting structure 63 is configured to support the first photonic crystal layer 30. The first substrate 61 includes a first base plate 611 and a first electrode 612 arranged on the first base plate 611. The second substrate 62 includes a second base plate 621 and a second electrode 622 arranged on the second base plate 621. There is a distance between the first substrate 61 and the second substrate 62. The second base plate 621 is a flexible base plate.

It should be noted that the supporting structure 63 may be a supporting cylinder. The first adjusting component 60 further includes a fixing structure which is located between the first substrate 61 and the second substrate 62 and located on lateral sides of the first substrate 61 and the second substrate 62. The fixing structure is configured to maintain a certain distance between the first substrate 61 and the second substrate 62.

The second base plate 621 may be a plastic film. A material of the plastic film may include, for example, at least one of polyimide, polycarbonate, polyacrylate and polyetherimide. The first base plate 611 may be a rigid base plate rather than a flexible base plate, for example, the first base plate 611 may be a glass base plate. Optionally, the first base plate 611 and a display surface of the display panel 20 may be arranged in parallel.

To prevent adversely affecting light transmittance, all components in the first adjusting component 60 may preferably be made of a transparent material.

Based on the structure of first adjusting component 60, by adjusting an electric field generated between the first electrode 612 and the second electrode 622, the second substrate 62 may be recessed inward or protruded outward.

In this way, by providing several first adjusting components below the first photonic crystal layer 30 and arranging the first adjusting components reasonably and by controlling the electric field between the first electrode 612 and the second electrode 622 in each first adjusting component 60, the angle of the first photonic crystal layer 30 relative to the light-emitting surface of the display panel 20 can be controlled.

Figure 10A:
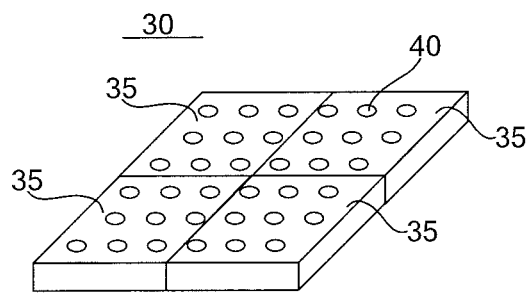
FIG. 10a schematically shows a first photonic crystal layer formed by multiple independent first photonic crystal blocks according to at least one embodiment of the present disclosure.
Figure 10B:
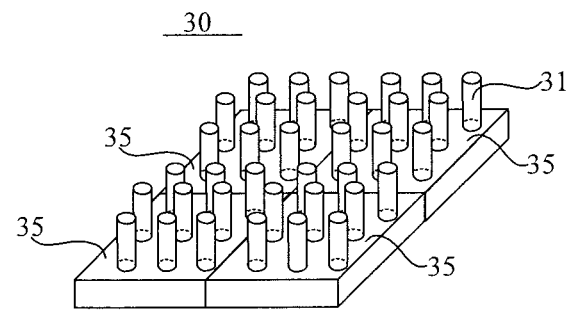
FIG. 10b schematically shows a first photonic crystal layer formed by multiple independent first photonic crystal blocks according to at least one embodiment of the present disclosure.

As shown in FIG. 10a and FIG. 10b, the first photonic crystal layer 30 is formed by multiple independent first photonic crystal blocks 35. An angle of each first photonic crystal block 35 relative to the light-emitting surface of the display panel 20 is adjusted through multiple first adjusting components 60.

That is to say, the first photonic crystal layer 30 is divided into multiple regions, and each region is one independent first photonic crystal block 35. One first photonic crystal block 35 may include at least one photonic crystal unit.

Figure 11A:
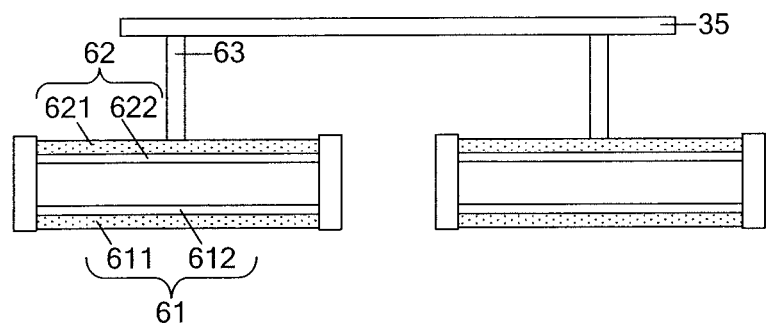
FIG. 11a schematically shows an adjustment performed by a first adjusting component on a first photonic crystal block according to at least one embodiment of the present disclosure.
Figure 11B:
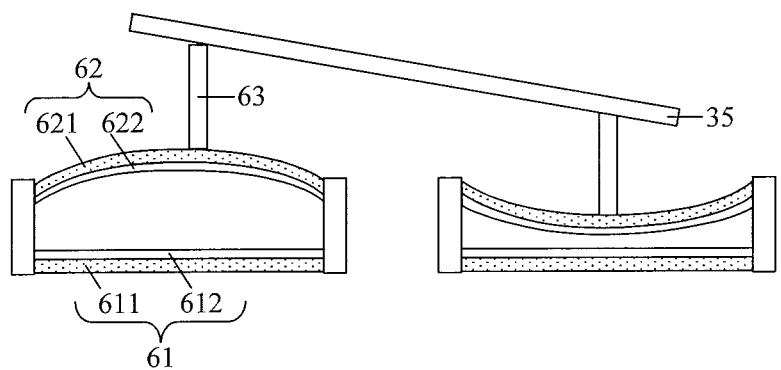
FIG. 11b schematically shows an adjustment performed by a first adjusting component on a first photonic crystal block according to at least one embodiment of the present disclosure.

In a case that the light in the Z direction needs to form an angle relative to the light-emitting surface of the display panel 20, as shown in FIG. 11b, the second substrate 62 of the first adjusting component 60 located at a left side of the first photonic crystal block 35 may be controlled to be protruded, and the second substrate 62 of the first adjusting component 60 located at a right side of the first photonic crystal block 35 may be controlled to be recessed. In this case, as shown in FIG. 12b, the first photonic crystal block 35 inclines to the right relative to the light-emitting surface of the display panel 20; correspondingly, emergent light in the Z direction inclines to the right relative to the light-emitting surface of the display panel 20. In addition, when the first photonic crystal block 35 and the light-emitting surface of the display panel 20 form a certain angle, the light in the Z direction and the light-emitting surface of the display panel 20 form the same angle.

Figure 11C:
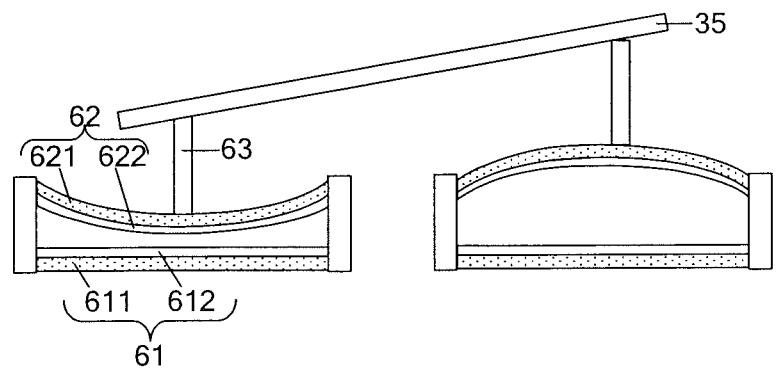
FIG. 11c schematically shows an adjustment performed by a first adjusting component on a first photonic crystal block according to at least one embodiment of the present disclosure.

As shown in FIG. 11c, optionally, the second substrate 62 of the first adjusting component 60 located at the left side of the first photonic crystal block 35 may be controlled to be recessed, and the second substrate 62 of the first adjusting component 60 located at the right side of the first photonic crystal block 35 may be controlled to be protruded. In this case, as shown in FIG. 12c, the first photonic crystal block 35 inclines to the left relative to the light-emitting surface of the display panel 20; correspondingly, emergent light in the Z direction inclines to the left relative to the light-emitting surface of the display panel 20. In addition, when the first photonic crystal block 35 and the light-emitting surface of the display panel 20 form a certain angle, the light in the Z direction and the light-emitting surface of the display panel 20 form the same angle.

For the above two cases, a degree to which the second substrate 62 recesses or protrudes may be determined by an intensity of the electric field between the first electrode 612 and the second electrode 622.

Figure 12A:
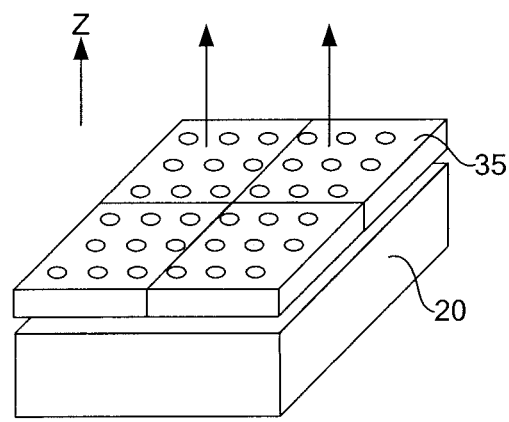
FIG. 12a schematically shows positions of multiple first photonic crystal blocks relative to a display panel according to at least one embodiment of the present disclosure.
Figure 12B:
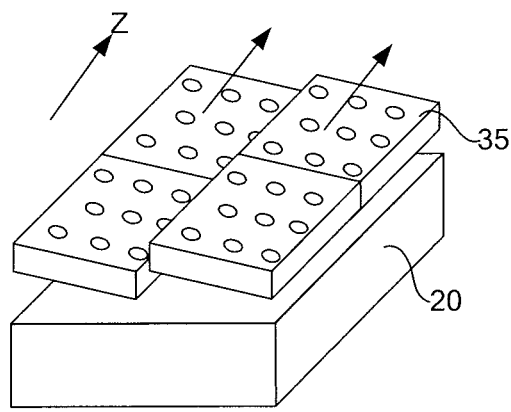
FIG. 12b schematically shows positions of multiple first photonic crystal blocks relative to a display panel according to at least one embodiment of the present disclosure.
Figure 12C:
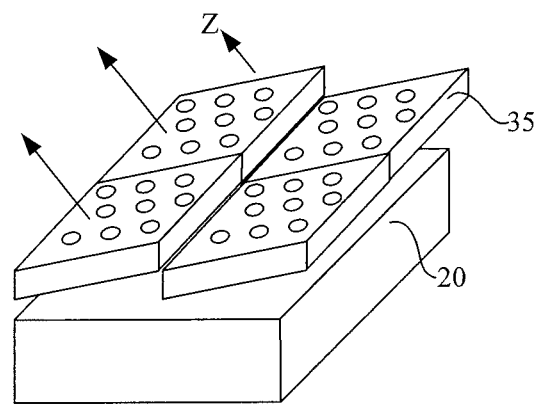
FIG. 12c schematically shows positions of multiple first photonic crystal blocks relative to a display panel according to at least one embodiment of the present disclosure.

As shown in FIG. 12a, when no electric field is formed between the first electrode 612 and the second electrode 622, the emergent light in the Z direction is perpendicular to the light-emitting surface of the display panel 20. Here, the first photonic crystal block 35 is in parallel with the light-emitting surface of the display panel 20. (As shown in FIG. 11a).

By dividing the first photonic crystal layer 30 into multiple independent first photonic crystal blocks 35 and adjusting, through multiple first adjusting components 60, the angle of each first photonic crystal block 35 relative to the light-emitting surface of the display panel 20, all the first photonic crystal blocks 35 may be enabled to form a same angle relative to the light-emitting surface of the display panel 20, thereby ensuring privacy effect.

In a case that the display device includes the first adjusting component 60, the display device may further include a collector. The collector is configured to collect an image of a face or a pupil of a user. The collector may be a camera. The display device may further include a controller that is configured to calculate a current position of the user based on the image of the face or the pupil of the user collected by the collector and control the first adjusting component in real time based on the current position to adjust a best angle of the first photonic crystal layer relative to the light-emitting surface of the display panel, to make emergent light from the first photonic crystal layer strike on the face or the pupil perpendicularly.

In view of the above, the collector collects the image of the face or the pupil, the controller calculates the current location of the user based on the image of the face or pupil and controls the first adjusting component 60 in real time based on the current position to adjust the angle of the first photonic crystal layer 30 relative to the light-emitting surface of the display panel 20, such that the emergent light from the first photonic crystal layer strikes on the face or pupil perpendicularly while users at other perspectives cannot see an image displayed on a display screen. Therefore, the display device provided in the embodiments of the present disclosure has high intelligence and better privacy protection user experience.

Optionally, the first photonic crystal layer 30 includes a periodic structure that generates an auto-collimation effect in the Z direction.

The auto-collimation effect of the photonic crystal refers to a phenomenon that when propagating in the photonic crystal and modulated by the periodic structure of the photonic crystal, the light propagates in a certain direction along a straight line without diffraction and a width of a light ray maintains unchanged. Here, the certain direction is the Z direction.

Figure 13A:
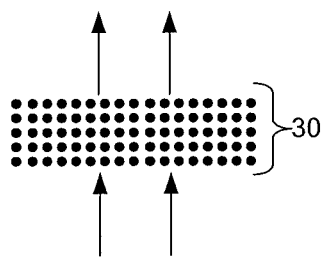
FIG. 13a schematically shows propagation of light in an auto-collimation photonic crystal layer according to at least one embodiment of the present disclosure.
Figure 13B:
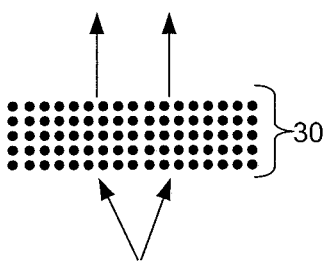
FIG. 13b schematically shows propagation of light in an auto-collimation photonic crystal layer according to at least one embodiment of the present disclosure.

It can be understood that the first photonic crystal layer 30 is an auto-collimation photonic crystal layer. When the light enters the first photonic crystal layer 30 along the Z direction, as shown in FIG. 13a, the light propagates in a collimated manner within the first photonic crystal layer 30. If the light enters the first photonic crystal layer 30 inclinedly at a certain angle as shown in FIG. 13b, the light can still propagate in a collimated manner within the first photonic crystal layer 30. That is, auto-collimation has a certain tolerance for an incident angle of the light.

It should be noted that, in order to enable most of the light emitted by the display panel 20 to exit in the Z direction through the first photonic crystal layer 30, in an aspect, an emergent angle of the light of the display panel 20 can be controlled, for example, an OLED display panel may be utilized or a divergence angle of a light ray of a backlight of a liquid crystal display panel is as small as possible. In another aspect, incident light in a wide angle range may be automatically collimated by controlling the structure of the first photonic crystal layer 30.

The auto-collimation photonic crystal layer may be a two-dimensional photonic crystal structure having circular air-holes. Different from the two-dimensional photonic crystal that generates visible light photon forbidden bands in the X and Y directions, directions of the air-holes of the auto-collimation photonic crystal layer are different, and a photon forbidden band of the auto-collimation photonic crystal layer is not within a range of visible light. Of course, the auto-collimation photonic crystal layer may optionally have a three-dimensional structure. Both the two-dimensional structure and the three-dimensional structure may be made through a laser holographic lithography. The three-dimensional structure may also be made through approaches such as a self-assembly where particle balls spontaneously form a periodic structure or stacking and preparing three-dimensional photonic crystals.

As shown in FIG. 13a and FIG. 13b, the first photonic crystal layer 30 is a particle ball three-dimensional structure.

In an embodiment of the present disclosure, by making the first photonic crystal layer 30 generate auto-collimation effect in the Z direction, the light emitted by the display panel 20 may exit in an auto-collimation way in the Z direction and can be seen only in a direct front perspective.

Figure 13C:
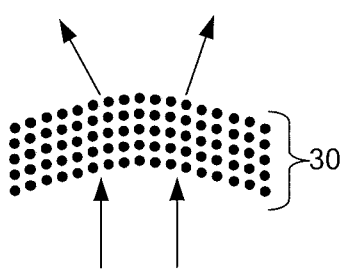
FIG. 13c schematically shows propagation of light in an auto-collimation photonic crystal layer according to at least one embodiment of the present disclosure.
Figure 14:
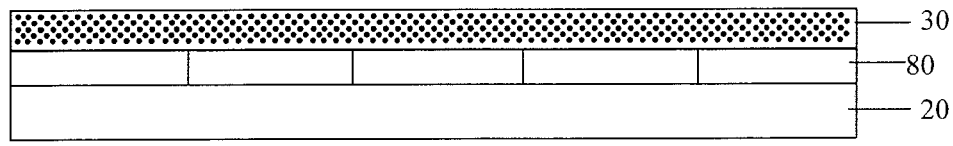
FIG. 14 is a schematic diagram of a display device according to at least one embodiment of the present disclosure.

In a case that the first photonic crystal layer 30 is in a protruding shape, i.e., the first photonic crystal layer 30 is recessed inwardly at a side facing the incident light as shown in FIG. 13c, the light diverges. Considering the above case, as shown in FIG. 14, a second adjusting component 80 can be optionally arranged between the display panel 20 and the first photonic crystal layer 30 to adjust a shape of the first photonic crystal layer 30. The shape of the first photonic crystal layer 30 includes a flat shape and the protruding shape.

It should be noted that the flat shape means a top surface and a bottom surface of the first photonic crystal layer 30 are in parallel with the light-emitting surface of the display panel 20. The protruding shape means the first photonic crystal layer 30 protrudes to a side away from the display panel 20.

FIG. 14 exemplarily shows multiple second adjusting components 80, but embodiments of the present disclosure are not limited thereto.

In an embodiment of the present disclosure, by providing the second adjusting component 80 and by adjusting, through the second adjusting component, the first photonic crystal layer 30 into the protruding shape, the light emitted by the display panel 20 diverges after passing through the first photonic crystal layer 30, such that the light can be seen not only in the direct perspective but also at side perspectives, thereby sharing the display device with other users at the side perspectives. The display device can achieve both privacy display and shared display and can satisfy different user requirements.

Figure 15:
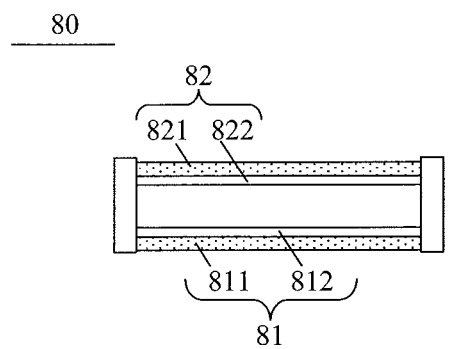
FIG. 15 is a schematic diagram of a second adjusting component according to at least one embodiment of the present disclosure.

Furthermore, as shown in FIG. 15, the second adjusting component 80 includes a third substrate 81 and a fourth substrate 82. The first photonic crystal layer 30 is arranged on the fourth substrate 82. The third substrate 81 includes a third base plate 811 and a third electrode 812 arranged on the third base plate 811. The fourth substrate 82 includes a fourth base plate 821 and a fourth electrode 822 arranged on the fourth base plate 821. There is a distance between the third substrate 81 and the fourth substrate 82. The fourth base plate 821 is a flexible base plate.

It should be noted that in order to fix the third substrate 81 and the fourth substrate 82, the second adjusting component 80 further includes a fixing structure, which is located between the third substrate 81 and the fourth substrate 82 and located on lateral sides of the third substrate 81 and the fourth substrate 82. The fixing structure is configured to maintain a certain distance between the third substrate 81 and the fourth substrate 82.

The fourth base plate 821 may be a plastic film. A material of the plastic film may include, for example, at least one of polyimide, polycarbonate, polyacrylate and polyetherimide. The third base plate 811 may be a rigid base plate rather than a flexible base plate, for example, the third base plate 811 may be a glass base plate. Optionally, the third base plate 811 and a display surface of the display panel 20 may be arranged in parallel.

To prevent adversely affecting light transmittance, all components in the second adjusting component 80 may optionally be made of a transparent material.

Based on the structure of second adjusting component 80, by adjusting an electric field generated between the third electrode 812 and the fourth electrode 822, the fourth base plate 821 may be protruded outward.

Figure 16:
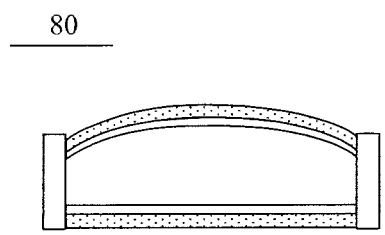
FIG. 16 schematically shows a second adjusting component in a protruding shape according to at least one embodiment of the present disclosure.

As shown in FIG. 16, when the light needs to exit divergently, the second adjusting component 80 may be controlled to be in the protruding shape. In this case, the first photonic crystal layer 30 on the second adjusting component 80 may be in the protruding shape as the second adjusting component 80 changes. When the light needs to exit in a collimated manner, it only needs to cut off electricity to prevent from generating any electric field between the third electrode 812 and the fourth electrode 822 as shown in FIG. 15.

By adjusting the electric field between the third electrode 812 and the fourth electrode 822 in the second adjusting component 80, the protruding shape of the first photonic crystal layer 30 can be controlled accurately.

Figure 17:
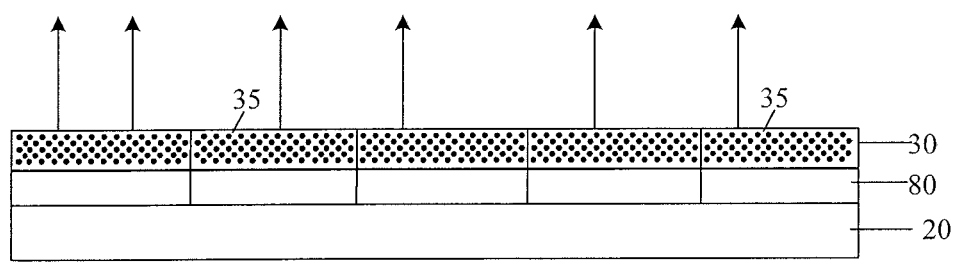
FIG. 17 schematically shows a first photonic crystal layer including multiple independent first photonic crystal blocks in a flat shape according to at least one embodiment of the present disclosure.
Figure 18:
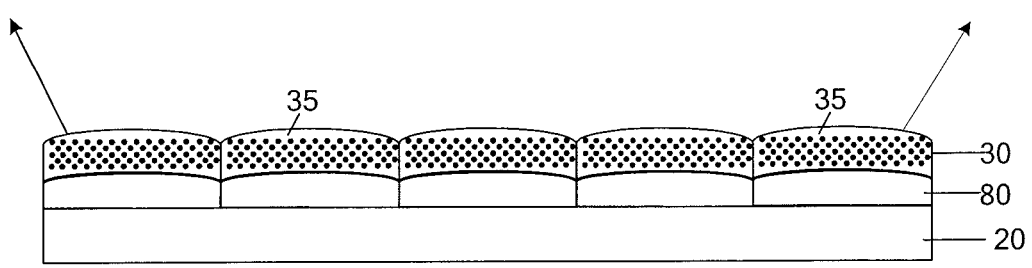
FIG. 18 schematically shows a first photonic crystal layer including multiple independent first photonic crystal blocks in a protruding shape according to at least one embodiment of the present disclosure.

As shown in FIG. 17 and FIG. 18, the first photonic crystal layer 30 is formed by multiple independent first photonic crystal blocks 35. Each first photonic crystal block 35 corresponds to one second adjusting component 80.

That is, the first photonic crystal layer 30 is divided into multiple regions, and each region is one independent first photonic crystal block 35.

By dividing the first photonic crystal layer 30 into multiple independent first photonic crystal blocks 35 and adjusting the shape of each first photonic crystal block 35 via one second adjusting component 80, the first photonic crystal layer 30 may have better diverging effect for light.

Figure 19:
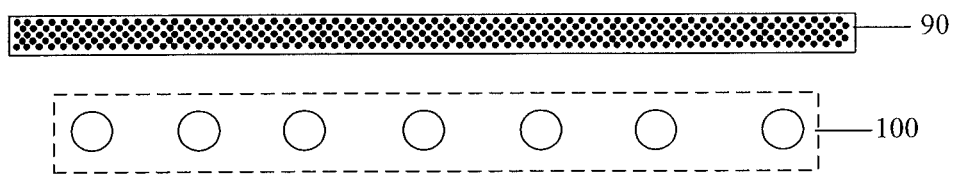
FIG. 19 is a schematic diagram of a light source according to at least one embodiment of the present disclosure.

A light source is further provided according to an embodiment of the present disclosure. As shown in FIG. 19, the light source includes a light source body 100 and a third photonic crystal layer 90. The third photonic crystal layer 90 is configured to make light emitted by the light source body 100 propagate in an auto-collimated manner along a Z direction. The Z direction is a thickness direction of the third photonic crystal layer 90.

It should be noted, in order to enable most of the light emitted by the light source body 100 to exit in the Z direction through the third photonic crystal layer 90, in an aspect, an emergent angle of the light of the light source body 100 can be controlled, i.e., a divergence angle of a light ray of the light source body 100 is controlled to be as small as possible. In another aspect, incident light in a wide angle range may be automatically collimated by controlling the structure of the third photonic crystal layer 90.

In the embodiment of the present disclosure, the third photonic crystal layer 90 generates the auto-collimation effect in the Z direction, and the light emitted by the light source body 100 exits in an auto-collimated manner along the Z direction, thereby achieving privacy protection effect.

Optionally, a third adjusting component may be arranged between the light source body 100 and the third photonic crystal layer 90, to adjust a shape of the third photonic crystal layer 90. The shape of the third photonic crystal layer 90 includes a flat shape and a protruding shape.

Furthermore, the third adjusting component may include a fifth substrate and a sixth substrate. The third photonic crystal layer 90 is arranged on the sixth substrate. The fifth substrate includes a fifth base plate and a fifth electrode arranged on the fifth base plate. The sixth substrate includes a sixth base plate and a sixth electrode arranged on the sixth base plate. There is a distance between the fifth substrate and the sixth substrate. The sixth base plate is a flexible base plate.

By generating an electric field between the fifth electrode and the sixth electrode, the sixth base plate may be protruded outward. In a case that an electric field is generated between the fifth electrode and the sixth electrode, the third adjusting component adjust the third photonic crystal layer to be in the protruding shape. In a case that no electric field is generated between the fifth electrode and the sixth electrode, the third adjusting component adjusts the third photonic crystal layer to be in the flat shape. The third adjusting component may be understood in reference to the second adjusting component 80 described above and is not repeated herein.

The above descriptions are merely alternative embodiments of the present disclosure, but the present disclosure is not limited thereto. It should be noted that, some improvements and substitutions can be made by those skilled in the art without departing from the principle of the present disclosure, and these improvements and substitutions shall also fall within the scope of the present disclosure.

What is claimed is:

1. A display device, comprising a display panel and a first photonic crystal layer arranged at a light-emitting side of the display panel, wherein the first photonic crystal layer is configured to enable incident light to exit along a Z direction of the first photonic crystal layer, the Z direction being a thickness direction of the first photonic crystal layer, wherein the first photonic crystal layer comprises a periodic structure having visible light photon forbidden bands in an X direction and in a Y direction; the X direction is different from Y direction, and a plane where the X direction and the Y direction are located is perpendicular to the Z direction, wherein a first adjusting component is arranged between the display panel and the first photonic crystal layer, and the first adjusting component is configured to adjust an angle of the first photonic crystal layer relative to a light-emitting surface of the display panel, wherein the first adjusting component comprises a first substrate and a second substrate opposite to each other, and a supporting structure arranged on the second substrate, the supporting structure being configured to support the first photonic crystal layer, wherein the first substrate comprises a first base plate and a first electrode arranged on the first base plate, and the second substrate comprises a second base plate and a second electrode arranged on the second base plate; and there is a distance between the first substrate and the second substrate, and the second base plate is a flexible base plate, and wherein the first photonic crystal layer comprises a plurality of independent first photonic crystal blocks, each of the plurality of first photonic crystal blocks is supported by a plurality of first adjusting components, and the plurality of first adjusting components corresponding to each first photonic crystal block is configured to control degrees that second base plates of the plurality of first adjusting components recess inward or protrude outward, to enable the supported first photonic crystal block to rotate relative the light-emitting surface of the display panel.

2. The display device according to claim 1, wherein the display panel comprises a first color sub-pixel, a second color sub-pixel and a third color sub-pixel;

wherein the first photonic crystal layer comprises a first photonic crystal unit corresponding to the first color sub-pixel, a second photonic crystal unit corresponding to the second color sub-pixel, and a third photonic crystal unit corresponding to the third color sub-pixel; and wherein a frequency band of first color light emitted by the first color sub-pixel is within a photon forbidden band of the first photonic crystal unit, a frequency band of second color light emitted by the second color sub-pixel is within a photon forbidden band of the second photonic crystal unit, and a frequency band of third color light emitted by the third color sub-pixel is within a photon forbidden band of the third photonic crystal unit.

3. The display device according to claim 2, wherein a light-absorbing layer is arranged between any two adjacent crystal units of the first photonic crystal unit, the second photonic crystal unit and the third photonic crystal unit.

4. The display device according to claim 1, wherein the second base plate is made of at least one of polyimide, polycarbonate, polyacrylate and polyetherimide, and the second substrate is recessed inward or protruded outward by adjusting an electric field generated between the first electrode and the second electrode.

5. The display device according to claim 1, further comprising a collector configured to collect an image of a face or an image of a pupil of a user; wherein the display device further comprises a controller configured to: calculate a current position of the user based on the image of the face or the pupil of the user collected by the collector, and control the first adjusting component in a real-time manner based on the current position to adjust the angle of the first photonic crystal layer relative to the light-emitting surface of the display panel, to enable emergent light from the first photonic crystal layer to strike on the face or the pupil perpendicularly.

6. The display device according to claim 1, wherein the first photonic crystal layer comprises a periodic structure having an auto-collimation effect in the Z direction, the incident light modulated by the periodic structure of a photonic crystal propagates in the Z direction along a straight line, and a width of a ray of the propagated light maintains unchanged.

7. The display device according to claim 6, wherein a second adjusting component is arranged between the display panel and the first photonic crystal layer, the second adjusting component is configured to adjust a shape of the first photonic crystal layer, and the shape of the first photonic crystal layer comprises a flat shape and a protruding shape.

8. The display device according to claim 7, wherein the second adjusting component comprises a third substrate and a fourth substrate arranged opposite to each other, and the first photonic crystal layer is arranged on the fourth substrate;

wherein the third substrate comprises a third base plate and a third electrode arranged on the third base plate, and the fourth substrate comprises a fourth base plate and a fourth electrode arranged on the fourth base plate;

wherein there is a distance between the third substrate and the fourth substrate, and the fourth base plate is a flexible base plate; and wherein the fourth base plate is protruded outward due to an electric field generated between the third electrode and the fourth electrode, and the second adjusting component is configured to adjust the first photonic crystal layer to be in the protruding shape when the electric field is generated between the third electrode and the fourth electrode, and adjust the first photonic crystal layer to be in the flat shape when no electric field is generated between the third electrode and the fourth electrode.

9. The display device according to claim 8, wherein the first photonic crystal layer comprises a plurality of independent first photonic crystal blocks, and each of the plurality of first photonic crystal blocks corresponds to one of the second adjusting component.

10. The display device according to claim 7, wherein the protruding shape comprises the first photonic crystal layer protruding to a side away from the display panel, and the first photonic crystal layer in the protruding shape makes light rays emitted by the display panel diffuse after passing through the first photonic crystal layer.

11. The display device according to claim 1, wherein the first photonic crystal layer is an air-hole two-dimensional photonic crystal layer comprising periodic air-holes, the air-holes each extending in the Z direction.

12. The display device according to claim 11, wherein the air-hole two-dimensional photonic crystal layer is made of a silicon thin film, and the periodic air-holes are formed through processes comprising exposing and etching the silicon thin film.

13. The display device according to claim 1, wherein the first photonic crystal layer is a medium cylinder two-dimensional photonic crystal layer comprising periodic medium cylinders, the medium cylinders each extending in the Z direction.

14. The display device according to claim 13, wherein the periodic medium cylinders are formed by depositing a silicon thin film on a light-emitting surface of the display panel and through processes comprising exposing and etching the silicon thin film.

15. A light source, comprising a light source body and a third photonic crystal layer, wherein the third photonic crystal layer comprises a periodic structure that enables incident light to generate an auto-collimation effect in a Z direction, the Z direction being a thickness direction of the third photonic crystal layer, wherein the third photonic crystal layer comprises a periodic structure having a visible light photon forbidden bands in an X direction and in a Y direction; the X direction is different from the Y direction, and a plane where the X direction and the Y direction are located is perpendicular to the Z direction, wherein a first adjusting component is arranged between the light source body and the third photonic crystal layer, and the first adjusting component is configured to adjust an angle of the third photonic crystal layer relative to a light-emitting surface of the light source body, wherein the first adjusting component comprises a first substrate and a second substrate opposite to each other, and a supporting structure arranged on the second substrate, the supporting structure being configured to support the third photonic crystal layer, wherein the first substrate comprises a first base plate and a first electrode arranged on the first base plate, and the second substrate comprises a second base plate and a second electrode arranged on the second base plate; and there is a distance between the first substrate and the second substrate, and the second base plate is a flexible base plate, and wherein the third photonic crystal layer comprises a plurality of independent first photonic crystal blocks, each if the plurality of first photonic crystal blocks is supported by a plurality of first adjusting components, and the plurality of first adjusting components corresponding to each first photonic crystal block is configured to control degrees that second base plates of the plurality of first adjusting components recess inward or protrude outward, to enable the supported first photonic crystal block to rotate relative to the light-emitting surface of the light source body.

16. The light source according to claim 15, wherein a third adjusting component is arranged between the light source body and the third photonic crystal layer, the third adjusting component is configured to adjust a shape of the third photonic crystal layer, and the shape of the third photonic crystal layer comprises a flat shape and a protruding shape.

17. The light source according to claim 16, wherein the third adjusting component comprises a fifth substrate and a sixth substrate arranged opposite to each other, and the third photonic crystal layer is arranged on the sixth substrate;

wherein the fifth substrate comprises a fifth base plate and a fifth electrode arranged on the fifth base plate, and the sixth substrate comprises a sixth base plate and a sixth electrode arranged on the sixth base plate;

wherein there is a distance between the fifth substrate and the sixth substrate, and the sixth base plate is a flexible base plate; and wherein the sixth base plate is protruded outward due to an electric field generated between the fifth electrode and the sixth electrode, and the third adjusting component is configured to adjust the third photonic crystal layer to be in the protruding shape when an electric field is generated between the fifth electrode and the sixth electrode, and adjust the third photonic crystal layer to be in the flat shape when no electric field is generated between the fifth electrode and the sixth electrode.

* * * * *